3,282,829
**PROCESS FOR THE SEPARATION OF UNSATU-
RATED HYDROCARBONS FROM MIXTURES
CONTAINING SUCH HYDROCARBONS**
Manfred Förderreuther, Ulrich Schwenk, and Günter Mau, all of Frankfurt am Main, Germany, assignors to Farbwerke Hoechst Aktiengesellschaft vormals Meister Lucius & Bruning, Frankfurt am Main, Germany, a corporation of Germany
No Drawing. Filed Apr. 17, 1962, Ser. No. 188,264
Claims priority, application Germany, Apr. 21, 1961,
F 33,725
3 Claims. (Cl. 208—311)

The present invention relates to a process for the separation of unsaturated hydrocarbons from mixtures containing such hydrocarbons.

It is known that olefins and substituted olefins form complexes with salts of heavy metals, for example platinum salts, silver salts, copper-(I) salts and mercury-(II) salts by additive combination with the respective metal ions. It is also known that this capacity of forming complexes can be utilized for the separation of unsaturated hydrocarbons from the mixtures thereof with saturated hydrocarbons. Thus it is possible to separate especially gaseous or liquid olefins and substituted olefins, but also aromatic hydrocarbons, from corresponding gaseous or liquid mixtures by means of aqueous silver salt solutions, the solutions of silver borofluoride being preferred.

Silver borofluoride in aqueous solution has an especially good dissolving power for olefins and aromatic hydrocarbons. Thus an aqueous silver borofluoride solution containing 600 grams of silver per liter of solution dissolves, for example, 110 liters of ethylene at 20° C. under an ethylene partial pressure of one atmosphere.

Now we have found that the separation of olefins and/or aromatic hydrocarbons from gaseous or liquid hydrocarbon mixtures containing said olefins and/or aromatic hydrocarbons (which gaseous or liquid hydrocarbon mixtures are designated hereinafter as fluid hydrocarbon mixtures), can be essentially improved by using for the separation of the olefins and/or aromatic hydrocarbons not pure aqueous solutions of silver borofluoride but aqueous solutions containing additions of free fluoboric acid and/or alkali metal borofluorides, i.e. solutions containing an excess amount of borofluoride ions in comparison with the silver ions. The numerical proportion of silver ions to borofluoride ions in these solutions thus is not 1:1, but smaller than 1:1, preferably within the range of 1:1.1 to 1:2. Solutions of this kind have an essentially increased capacity for unsaturated hydrocarbons as compared to solutions in which the numerical proportion of silver ions to borofluoride ions is only 1:1.

An increase in the concentration of the borofluoride ions, calculated on the concentration of the silver ions, is preferably attained by adding surplus fluoboric acid to the aqueous solutions of silver borofluoride. The operation is advantageously carried out such that silver borofluoride is not dissolved in water but in an aqueous solution of fluoboric acid.

The utilization of silver borofluoride solutions combined with fluoboric acid offers another great advantage, viz. that these solutions are stable against hydrogen in a much higher degree than aqueous silver borofluoride solutions in which the silver ions and the borofluoride ions are present in the proportion of 1:1. This additional advantage always becomes apparent in those cases when the gaseous mixtures which are to be separated also contain hydrogen which, as is well-known, readily precipitates metallic silver from the solution, especially at higher temperatures. The precipitation of silver can, it is true, be prevented in an even higher degree or small amounts already of precipitated silver be dissolved again by adding hydrogen peroxide to the silver borofluoride solutions combined with fluoboric acid, as this has already been proposed in the case of aqueous silver borofluoride solutions.

Instead of free fluoboric acid there may also be used water-soluble salts of this acid, especially lithium-, sodium-, beryllium-, cadmium-, cobalt-(II)-, nickel-, iron-(II)- and iron-(III)-borofluoride in order to prepare an aqueous solution of silver borofluoride in which the borofluoride ions are present in an excess amount as compared with the silver ions. However, aqueous solutions of the free fluorboric acid are generally preferred to the solutions of these salts because aqueous fluoboric acid solutions can be concentrated especially easily.

The silver borofluoride solutions used according to the invention in which the borofluoride ions are present in an excess amount as compared with the silver ions, i.e. in which the numerical proportion of silver ions to borofluoride ions in smaller than 1:1, do not provoke corrosion on refined steel. The free fluoboric acid is practically non volatile.

Unsaturated hydrocarbons which can be separated by the silver borofluoride solutions used according to the invention are those hydrocarbons which are in the gaseous or liquid state or which are in the dissolved state, i.e. which are present in the fluid state, at the reaction temperatures and which have one or several carbon-to-carbon double bonds. These double bonds may be of an olefinic or aromatic nature. Suitable olefins are especially those having 2 to 20 carbon atoms, which olefins may be linear, branched or cyclic mono-, di- or polyolefins. As typical examples there are mentioned ethylene, propylene, butenes, isobutenes, heptenes, dodecene-1, butadiene, isoprene, cyclopentene, cyclohexene, and lower alkylated cyclohexenes, for example cyclopentenes and cyclohexenes substituted by alkyl groups containing 1 to 4 carbon atoms. Aromatic hydrocarbons are especially benzene and substituted mononuclear hydrocarbons the aliphatic side chains of which are linear or branched and which have preferably up to 6 carbon atoms. In addition to benzene, there are especially preferred mononuclear, alkyl-substituted aromatic hydrocarbons having 7 to 12 carbon atoms, such as toluene, ethyl benzene, styrene, isopropyl benzene, hexyl benzene, the xylenes, mesitylene and the position isomers thereof. Especially suitable polynuclear aromatic compounds are tetrahydro-naphthalene, naphthalene and alkylated naphthalenes. By the term "aromatic substances" there are not only understood the aromatic basic hydrocarbons and their derivatives substituted by hydrocarbon radicals, but also those derivatives in which the aromatic nucleus is substituted by functional groups which, under the reaction conditions, have an inert behavior towards the fluoboric acid or the salts thereof present in the aqueous solution, such as halogen atoms, nitro-, sulfonic acid-, carboxylic acid-, hydroxy-, oxo groups and others. As particular requirement these functional groups, together with the silver ions of the aqueous solution, must not lead to substantial precipitations of unsoluble silver compounds.

As aromatic substances carrying functional groups there may be used benzoic acid, phthalic acid, isophthalic acid, terephthalic acid, chlorobenzene, dichlorobenzenes and other halogenated benzenes, nitro benzenes, benzenes containing more than one nitro group, such as m-di-nitrobenzene, phenol, acetophenone, aniline, pyridine etc.

In addition to the hydrocarbons or the derivatives thereof mentioned above the fluid hydrocarbon mixtures to be separated may also contain—especially when gaseous mixtures are used—other gaseous substances such as carbon dioxide, carbon monoxide, oxygen, hydrogen, nitrogen or noble gases.

When olefins higher than ethylene, for example propylene, are contained in the fluid hydrocarbon mixture to be separated, small amounts of the alcohols corresponding to the higher olefins may be formed in the case of a prolonged duration of the reaction. When small amounts of acetylene are contained in the fluid hydrocarbon mixture to be separated, there are formed silver acetylides which, however, remain in solution as long as a certain content of these compounds is not exceeded and which only precipitate when the concentration of the silver acetylides is substantially increased by the addition of large amounts of acetylenes. The utilization of silver borofluoride solutions combined with fluoboric acid, in which the numerical proportion of the ions corresponds to the proportion as cited above, is—as an additional measure—especially advantageous in the presence of acetylenes because, as this has already been proposed for aqueous silver borofluoride solutions, they can be freed again of silver acetylides at relatively low temperatures by heating them for some time at temperatures within the range of 50° to 150° C., preferably at boiling temperature. In the course of this operation the silver acetylides are split again into acetylenes and silver borofluoride. This is not possible when the fluoboric acid is replaced by one of the salts thereof since the pH value of the pure salt solutions is not sufficient for the splitting of the acetylides.

By using the silver borofluoride solutions of the composition according to the invention, in which the numerical proportion of silver ions to borofluoride ions is smaller than 1:1 as compared with corresponding solutions in which this proportion is 1:1, it has become possible to attain an essential increase of the capacity of the silver borofluoride solutions for unsaturated hydrocarbons while the concentration of the silver ions remains constant. This means that with the solutions of the composition according to the invention it has become possible to bind larger amounts of unsaturated hydrocarbons from fluid mixtures than is the case with the silver borofluoride solutions used according to earlier processess or proposals.

The separation of the fluid hydrocarbon mixtures or fluid mixtures containing hydrocarbons is carried out in known manner at temperatures below 150° C., preferably within the range of about 0° to 50° C. The natural lower limit is set by the freezing point of the aqueous salt solution.

In order to achieve that the olefins and/or the aromatic hydrocarbons are separated from the other components of the fluid hydrocarbon mixture in as high a degree as possible the process of the invention is advantageously carried out such that the aqueous silver salt solution and the mixture to be separated are allowed to act upon one another according to the counter-flow method.

Moreover, the amount of the silver ions in the aqueous solution shall at least be equivalent to the total amount of the substances to be eliminated which contain carbon-to-carbon bonds.

The concentration of the silver salt solution shall be as high as possible. The solution contains in general at least 100 grams, preferably 500 grams to 1200 grams, of silver per liter. It is, in principle, also possible to operate with lower silver salt concentrations, but this is not interesting from an economic point of view.

The enriched olefins and/or aromatic compounds can be isolated in various ways from the aqueous silver salt solution containing olefins and/or the aromatic compounds, which solution is practically free of saturated hydrocarbons, for example by freezing, by extraction by means of agitation with solvents, by simple heating or treatment under reduced pressure. Heating under reduced pressure has proved to be especially advantageous. A mixture of olefins and aromatic compounds expelled from the silver salt solution can, finally, be separated into its individual components by known processes, for example by distillation.

The following example serves to illustrate the invention but it is not intended to limit it thereto:

*Example*

Dry silver borofluoride was dissolved in aqueous fluoboric acid so that the solution contained 600 grams of silver per liter and the proportion of $Ag^+$ to $BF_4^-$ was 1:1.2. This solution had an ethylene capacity of 150 liters under a pressure of 1 atmosphere absolute at a temperature of 20° C. In the case of a silver borofluoride solution combined with fluoboric acid in which the proportion of $Ag^+$ to $BF_4^-$ was 1:1.1, the capacity was 125 liters, while with a silver borofluoride solution having a proportion $Ag^+$ to $BF_4^-$ of 1:1 the capacity amounted to 110 liters.

By the application of slightly elevated temperatures and the simultaneous application of a reduced pressure the dissolved ethylene can again be removed quantitatively from the solution.

We claim:

1. A process for separating a hydrocarbon having at least one carbon-to-carbon double bond from a fluid mixture thereof with a saturated hydrocarbon which comprises contacting said fluid mixture with an aqueous solution consisting essentially of silver borofluoride and fluoboric acid in which the numerical proportion of silver ions to borofluoride ions is within the range of 1:1.1 to 1:2.

2. A process as defined in claim 1 wherein the fluid mixture contains ethylene.

3. A process as claimed in claim 1, in which the fluid hydrocarbon mixture contains hydrogen.

References Cited by the Examiner

UNITED STATES PATENTS

| 2,953,589 | 9/1960 | McCaulay | 208—311 |
| 3,007,981 | 11/1961 | Baker et al. | 260—677 |
| 3,101,381 | 8/1963 | Baxter | 260—677 |

OTHER REFERENCES

Warf: J. Am. Chem. Soc., vol. 74, pages 3702–4 (1952).

DELBERT E. GANTZ, *Primary Examiner.*

ALPHONSO D. SULLIVAN, *Examiner.*

P. P. GARVIN, H. LEVINE, *Assistant Examiners.*